United States Patent [19]

Musgrave

[11] 4,355,939
[45] Oct. 26, 1982

[54] PALLETIZED POULTRY COOP HANDLING SYSTEM

[76] Inventor: Harry J. Musgrave, P.O. Box 214, Nashville, Ark. 71852

[21] Appl. No.: 107,626

[22] Filed: Dec. 27, 1979

[51] Int. Cl.³ .............................................. B65B 21/02
[52] U.S. Cl. ...................................... 414/413; 414/38; 414/102; 414/112; 198/407; 198/422; 198/434
[58] Field of Search ................ 414/38, 102, 112, 413; 198/407, 422, 434

[56] References Cited

U.S. PATENT DOCUMENTS

| | | | |
|---|---|---|---|
| 2,161,836 | 6/1939 | Stevenson | 414/413 X |
| 2,707,060 | 4/1955 | Nawman | |
| 3,512,625 | 5/1970 | Raynor et al. | 198/434 |
| 4,242,029 | 12/1980 | Musgrave | 414/413 |

Primary Examiner—Douglas C. Butler
Assistant Examiner—Terrance L. Siemens
Attorney, Agent, or Firm—Arnold, White & Durkee

[57] ABSTRACT

An apparatus for automatically handling palletized poultry coops containing live birds to empty the birds from the coops for hanging. A pallet loaded with tiers of poultry coops after removal from the livehaul truck by a forklift is placed on a conveyor to move automatically to the input end of a coop infeed conveyor extending transverse to the pallet conveyor. Upon alignment of the pallet with the coop infeed conveyor, a limit switch stops the pallet conveyor and an extractor is actuated which pushes a tier of coops off the pallet and onto the coop infeed conveyor. The tier of coops is moved along to an unstacker comprising a lay-down unit having a rotor with coop support arms arranged in quadrature such that the coops are laid down on an inclined conveyor with each quarter of a revolution. The inclined conveyor moves each of the coops in succession to a dumping unit that empties the coop. Each empty coop is urged from the dumping unit onto a conveyor and taken thereby to an inverter which turns the coop topside-up. Inverted coops drop down a slide and are transported by a belt conveyor to a restack rotor. After several coops are in position, the coops are set upright by the rotor into a stacked tier on an outfeed coop conveyor. The tier of empty coops is moved out toward the pallet conveyor and are loaded onto a pallet. After the pallet is filled with empty coops, the pallet is returned to the livehaul truck by a forklift.

1 Claim, 15 Drawing Figures

PALLETIZED POULTRY COOP HANDLING SYSTEM

BACKGROUND OF THE INVENTION

1. Field of the Invention

The present invention relates to apparatus for handling poultry coops containing live birds; and more particularly, it relates to apparatus for handling palletized poultry coops to automatically depalletize the coops, remove the birds from the coops, and outfeed the coops in tiers to be reloaded on a pallet.

2. Prior Art

In the past, handling poultry coops containing live chickens or the like brought to a poultry processing plant required that the coops be removed from a trailer with a forklift and manually unstacked onto a conveyor that moves the coops into the processing area of the plant. Inside the processing plant, the coops are opened and the birds manually removed. As a consequence of this technique for unloading poultry coops, a large number of people were required at the unloading dock and in the processing area. Also, as a result of the need to quickly unload the coops, rough handling typically resulted creating a risk of damage to the birds and to the coops. Live handling of poultry has been one of the major problems confronting the poultry industry over the years.

One attempt to alleviate the problem of high labor and damage in connection with the handling and unloading of poultry coops brought to the processing plant resulted in the poultry coop unstacking machine disclosed in U.S. Pat. No. 3,891,097. The apparatus disclosed receives tiered stacks of poultry coops at an unloading area, conveys them one tier at a time, and unstacks each tier onto a distribution system that carries the coops into the poultry processing plant.

More specifically, the poultry coop handling apparatus disclosed in the '097 patent receives stacked coops on a conveyor. The tiers of coops are conveyed single file to a lift platform where each tier is elevated. As the tier reaches the top of the elevator tower, the top coop is engaged by a belt and wheels move it onto a conveyor. After each coop is so moved, the elevator descends to pick-up another tier. The unstacked coops are then conveyed into the processing plant without manual effort.

Although the apparatus disclosed in the cited patent does obviate some labor in the unloading of coops containing live birds, much man power was still required in the overall operation which also involves removing the birds from the coops and readying the coops for re-stacking. Accordingly, further efforts have been made to provide a poultry coop handling system for use at a processing plant which would automate coop handling and unloading to a greater extent.

Among those to work on the problem has been the United States Department of Agriculture's Russell Research Center in Athens, Ga. An automatic coop handling system developed there, as described in BROILER INDUSTRY, January 1975, pages 63-65, included a powered coop infeed conveyor, a tilting frame, a dumping conveyor, and a coop outfeed conveyor. The system required special coops having side doors.

In operation of the system, tiers of coops are removed from the livehaul truck and placed on the powered infeed conveyor. The conveyor supplies on demand one tier of coops at a time to the tilting frame. Once in the frame, the tier of coops is rotated 90 degrees and the coops are deposited on their side on the coop outfeed conveyor. At a designated point, a metal slide under the coop door trips it open and birds fall to the dumping conveyor that takes them to the hang room.

The problem of more fully automating coop handling also received attention from private industry which developed the first commercial automatic system for handling coops. That system, developed by the applicant herein, is the subject of U.S. Pat. No. 4,242,029. In operation, the system receives poultry coops in tiers on an infeed conveyor. The coops are moved along in single file by the infeed conveyor which is under the control of the hang room personnel. A separation conveyor aligned with the infeed conveyor and moving at a greater travel rate pulls the lead tier away from the other tiers, with a control device which stops the infeed conveyor being actuated as the lead tier is moved along.

The separation conveyor moves the tier of coops onto a lay-down unit comprising an L frame adapted to receive a tier of coops and pivoted for movement between an upright position and an inclined position. When a tier of coops is resting on the L frame, another control device is depressed activating a hydraulic cylinder connected to the L frame which pivots the L frame into the inclined position. As the L frame is being inclined, another control device halts movement of the separation conveyor.

The L frame lays down the tier of coops on an inclined conveyor and activates the conveyor. The inclined conveyor is a chain conveyor with a dog which pushes the coops to the end of the incline. The conveyor continues to run transporting the coops to the end until the last coop is carried up and a control device is tripped, which also causes the hydraulic cylinder to raise the L frame to its upright position.

Each coop as it falls over the end of the inclined conveyor comes to rest in an unloading unit comprising a structure which supports the coop in an orientation that causes the coop door to open under gravity and the birds to fall out onto a conveyor disposed beneath the unloading unit. As a coop comes to rest in the support structure, a control device is engaged which activates a mechanism for pushing the coop out of the support structure and onto an elevator conveyor. The coop door remains open until the coop is pushed onto the elevator conveyor, which closes the coop door.

The elevator conveyor carries each coop, which is disposed upside down, to a coop inverter which turns over a coop passing therethrough. Inverted coops fall by gravity down a slide to a restack station operator who puts the coops onto an outfeed conveyor.

Because no suitable alternative to coops for confining live birds has been yet found, the entire handling operation of poultry has evolved around the use of a coop to confine and transport live birds. To facilitate loading and loading of coops between the livehaul truck and the house or processing plant, standard practice is to carry several tiers of coops on a pallet. The handling of pallet loaded tiers at the plane, however, interjects yet another time and labor consuming operation—depalletizing the coops.

Accordingly, the present invention of applicant provides a palletized coop handling system.

SUMMARY OF THE INVENTION

In one aspect of the invention, an automatically operating palletized coop handling system is provided in which a pallet loaded with tiers of coops is delivered to a coop infeed conveyor extending transversely to the pallet conveyor. An extractor removes a tier of coops from the pallet onto the coop infeed conveyor which transports the tier to an unstacker unit. A dumping unit receives unstacked coops in succession and empties the birds therefrom.

In a further aspect of the invention, a coop handling system is provided which includes a restacking unit that receives emptied coops and automatically sets them upright into a tier. A restacked tier of coops can be placed on an outfeed conveyor and moved to where the tier is loaded onto a pallet.

In another aspect of the invention, an automatically operating coop handling system is provided for emptying coops containing live birds, wherein an infeed conveyor transports a tier of coops placed thereon to a rotary lay-down unit which lays a tier of coops on its side upon another conveyor with each quarter of a revolution.

The rotary lay-down unit may comprise a rotor having coop support arms arranged in quadrature.

BRIEF DESCRIPTION OF THE DRAWINGS

In order that the invention may be more clearly understood, embodiments which are the best modes known by the inventor at this time for practicing the invention will be described. Those embodiments are illustrated in the attached drawings, wherein.

DETAILED DESCRIPTION OF PREFERRED EMBODIMENTS

Figure 1:
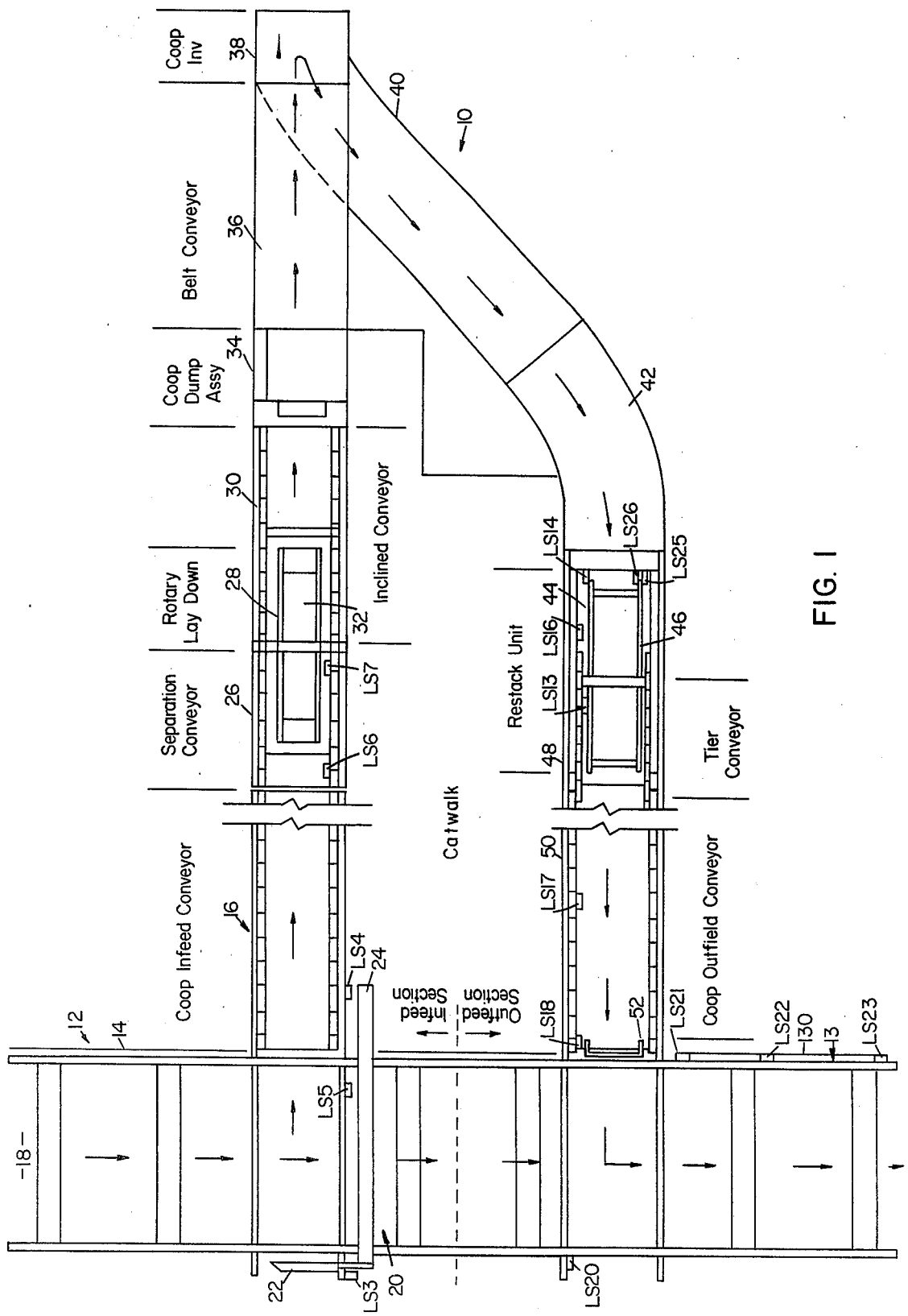
FIG. 1 is a plan view of a first embodiment of the palletized coop handling system having a straight through outfeed for reloaded pallets.
Figure 3:
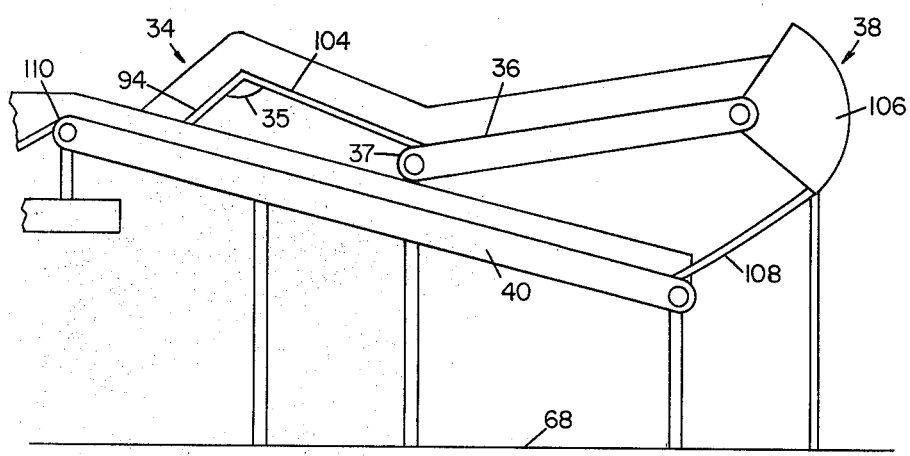
FIG. 3 is an elevation view of the empty coop route conveyors and coop inverter used in the palletized coop handling system.
Figure 4:
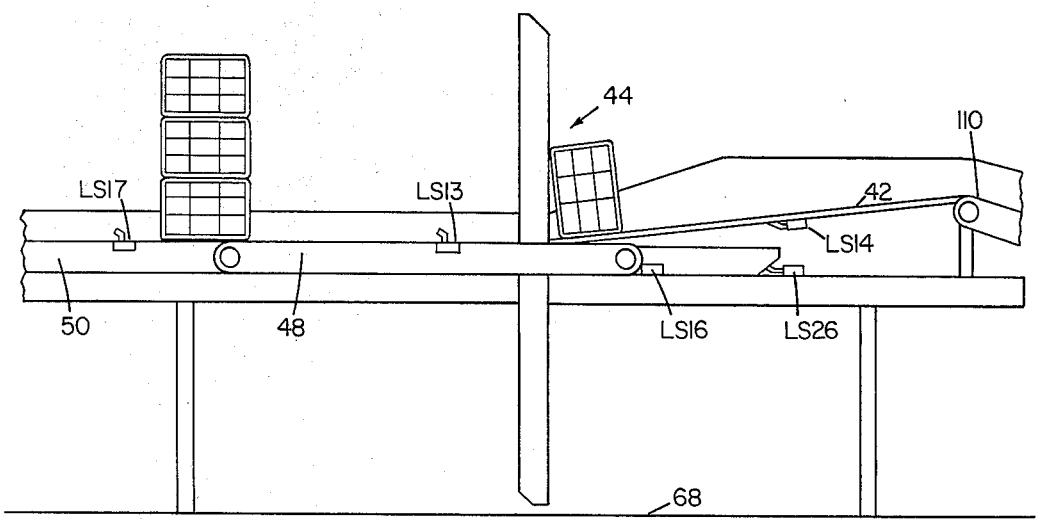
FIG. 4 is an elevation view of the coop out feed conveyor and coop restack sections of the palletized coop handling system.
Figure 5:
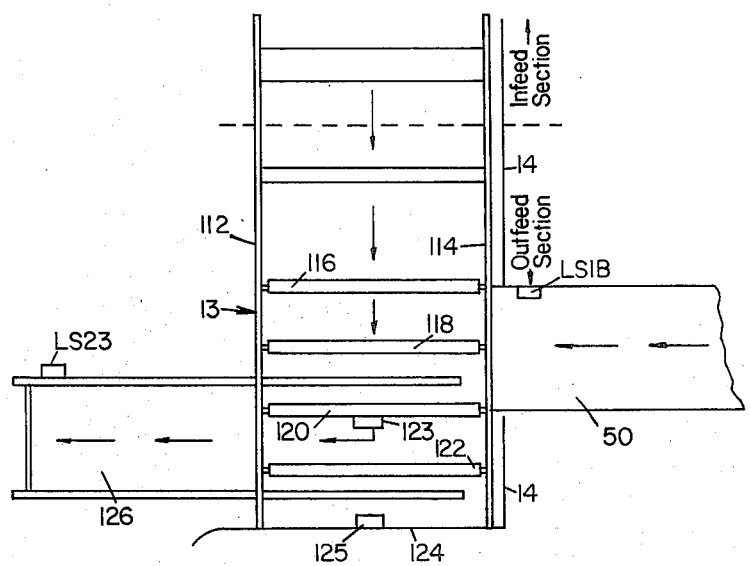
FIG. 5 is a plan view of an alternative pallet outfeed to be referred to as the right angle outfeed embodiment of the palletized coop handling system.
Figure 6:
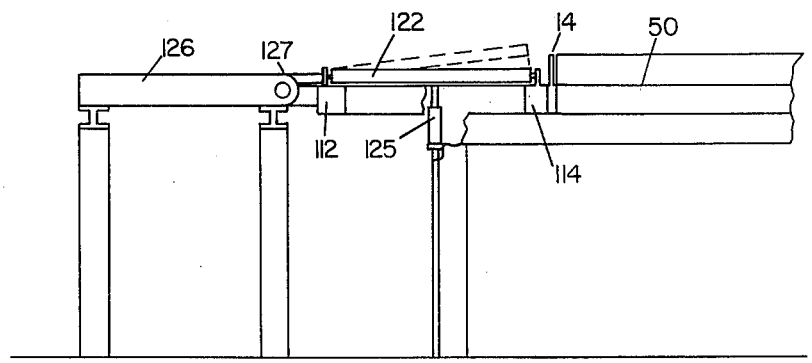
FIG. 6 is an elevation view of the alternate pallet outfeed shown in FIG. 5.

Referring to FIGS. 1-6 of the drawings, the general structural layout of a palletized poultry coop handling system in accordance with the present invention is presented. The drawing figures illustrate two palletized poultry coop handling system embodiments which differ in the manner of outfeed of pallets reloaded with empty coops. In FIG. 1, a "straight through" pallet outfeed is shown. In FIGS. 5 and 6, a "right angle" pallet outfeed is shown. The right angle outfeed embodiment of the palletized coop handling system will most often be preferred in a processing plant installation wherein two or more of the palletized coop handling systems are placed side-by-side. The right angle pallet outfeed, of course, reduces the floor area required to accommodate a multiple system installation.

Referring now to FIG. 1, the palletized poultry coop handling system is generally designated by the reference 10. In general, palletized coop handling system 10 includes an incoming pallet conveyor 12 having a pallet guide bar 14 extending along one side thereof. System 10 further includes a coop infeed conveyor 16 which extends transverse to incoming pallet conveyor 12 and is displaced from the infeed end 18 of conveyor 12. A control device LS5 mounted on incoming pallet conveyor 12 is positioned to be engaged by an incoming pallet loaded with tiers of poultry coops to indicate its alignment with coop infeed conveyor 16.

A coop tier extractor generally indicated by reference numeral 20 is provided in system 10 to off-load tiers of coops onto coop infeed conveyor 16 from a pallet aligned therewith. Extractor 20 comprises a vertical surface member 22 adapted to engage the bottom two coops of a tier. Member 22 is connected to a hydraulically driven, horizontally traveling carriage mechanism 24 which moves member 22 in a forward direction toward coop infeed conveyor 16 to push one or more tiers of coops off a pallet and onto conveyor 16, followed by movement in the reverse direction to the retracted position shown. Control devices LS4 and LS3 sense the position of extractor 20 in either the forward or contracted positions, respectively.

Coop infeed conveyor 16 is a hydraulically driven chain conveyor that moves tiers of coops placed thereon along a defined path to separation conveyor 26 which is similar to conveyor 16, but shorter and driven at a higher speed. Separation conveyor 26 by reason of its higher speed separates the lead tier on conveyor 16 from any remaining tiers of coops. As the lead tier is pulled into separation conveyor 26, a control device LS6 is engaged. Through an electrical control circuit including LS6, to be described later, movement of infeed conveyor 16 is stopped, with the remainder of any tiers of coops thereon held in readiness.

Separation conveyor 26 continues moving the lead tier and moves it into position on rotary lay-down unit 28. A control device LS7 senses the presence of a tier of coops in position for lay-down. Rotary lay-down unit 28 serves to unstack the tier of coops received thereon from separation conveyor 26 by forwardly tilting the tier to lay the coops therein on their side on a linear, inclined conveyor 30. In accordance with one aspect of the invention, to be described more fully later, the rotary lay-down unit 28 includes a rotor 32 adapted to lay a tier of coops onto inclined conveyor 30 with each quarter revolution.

Inclined conveyor 30 delivers one coop at a time to a coop dump assembly 34. Each coop delivered to dump assembly 34 is received and supported in an orientation that results in an opening of the coop door to release live birds therefrom coop onto a conveyor (not shown) that transports the birds to the hang room.

Empty coops are urged from the coop dump assembly to a belt conveyor 36 which transports the coops to a coop inverter 38. The coops are inverted to a topside-up orientation and dropped onto a second belt conveyor 40. The coops are released from belt conveyor 40 onto a short slide 42 over which the empty coops travel. One laborer is positioned proximate slide 42 to turn each of the empty coops 90° for positioning on restack unit 44.

After a desired number of coops, typically five, are in position on restack unit 44, the group of empty coops are set upright by a rotor 46 which is substantially identical to rotor 32. The upright coop tier is set on a tier conveyor 48 which transfers the tier of coops onto a coop outfeed conveyor 50.

In operation of the coop outfeed portion of system 10, after the desired number of coops have been placed on restack rotor 46, the operator activates a control-start push button (not shown) which causes the restack roter to rotate. A control device LS13 mounted adjacent tier conveyor 48 senses that a tier of coops has been set upright on conveyor 48 and stops rotation of the restack rotor. Tier conveyor 48 is started and continues to run until a dog on the conveyor trips a control device LS16 as the tier of coops goes out.

After several tiers of empty coops have been placed on coop outfeed conveyor 50, a control device LS17 is tripped which activates coop outfeed conveyor 50 to move the tiers of coops toward pallet-out conveyor 13.

The several tiers of empty coops are pushed onto a pallet which has been transferred across from infeed pallet conveyor 12 to the end of coop outfeed conveyor 50 by conveyor 13. Engagement of LS21 stops the forward half of the pallet in alignment with the end of conveyor 50. After the several tiers of empty coops have been loaded onto the pallet, coop outfeed conveyor 50 is stopped upon control device LS18 being tripped by a chain dog. Final positioning of the tiers of empty coops on the conveyor is by a manually controlled reload arm 52 at the end of coop outfeed conveyor 50 adjacent conveyor 13.

The pallet is again moved along on conveyor 13 until LS22 is engaged which again stops the pallet with the rearward half of the pallet being aligned with conveyor 50. Additional tiers of coops are then loaded on the pallet. The pallet is then moved to the end of conveyor 13. Upon engagement of LS23, conveyor 13 stops.

The pallet is then ready to be taken to a livehaul truck by a forklift.

Figure 2:
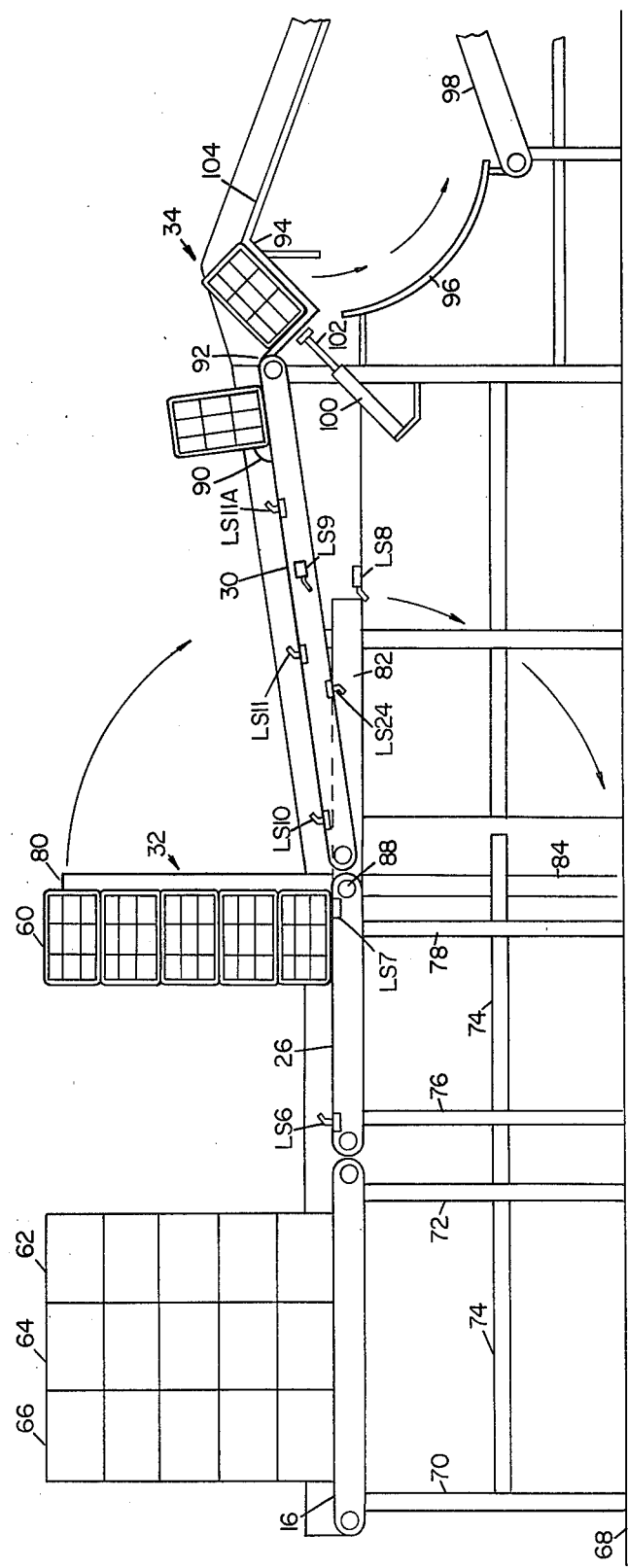
FIG. 2 is an elevation view of the coop infeed and coop unstacking sections of the palletized coop handling system in which a rotary lay-down unit is employed in the unstacking section.

Referring now to FIGS. 2–4, system 10 will be further explained in more detail, especially in connection with those features made more evident from the elevation views presented in those drawing figures.

In FIG. 2, four tiers of five coops each has been offloaded from a pallet on the incoming pallet conveyor onto coop infeed conveyor 16, and the lead tier 60 has been pulled ahead of tiers 62, 64 and 66 by separation conveyor 26. Conveyor 16 may be a conventional chain conveyor wherein a hydraulic motor is coupled to a chain, which bears the weight of the infeed load, by a sprocket that engages the chain and transmits motion thereto. Conveyor 16 is elevated off floor 68 by support legs 70, 72 having crossbrace 74 therebetween. The hydraulic motor driving conveyor 16 is controlled by an electrical control circuit to be described later.

Separation conveyor 26 is also a chain conveyor driven by a hydralic motor controlled by the electrical control circuit. Separation conveyor 26 is elevated above floor 68 on support legs 76, 78, with the crossbrace support 74 extending across from conveyor 16 to interconnect therewith. At the end of separation conveyor 26 adjacent conveyor 16, there is mounted the control device LS6 which may suitably be an electrical limit switch. In accordance with the operation prescribed by the electrical control circuit, movement of conveyor 16 is stopped when the lead tier 60 is pulled across control device LS6, with the remainder of the tiers of coops being held in readiness. The lead tier 60 is moved by separation conveyor 26 into the rotary lay-down unit against.

Rotor 32 of the rotary lay-down unit comprises four coop support arms 80, 82, 84 and 86 (not in view) arranged in quadrature. Rotor 32 is mounted for rotation about a horizontal axis of rotation 88 extending between the conveyor frame rails of separation conveyor 26 at the end thereof. Control device LS7, an electrical limit switch, is positioned on separation conveyor 26 to indicate proper positioning of lead tier 60 relative to rotor 32.

Rotor 32 of the rotary lay-down unit is rotated by a hydraulic motor coupled to a shaft that forms access of rotation 88. The hydraulic motor is also controlled by the electrical circuit. As will become better understood following a description of the electrical circuit for sequencing the operation of the entire coop handling system, the hydraulic motor driving rotor 32 is controlled to produce repeated quarter revolutions with an intermediate stop at an angle less than 90° prior to the completion of each quarter revolution.

In FIG. 2, rotor 32 is shown in the tier receiving position with tier 60 moved by conveyor 26 into position for tilting. As indicated by the arrows, rotor 32 rotates clockwise, which will forwardly tilt tier 60. As tier 60 is being tilted, the coops therein are supported from the side by support arm 80 and supported from the bottom by support arm 86 (not in view).

Rotation of rotor 32 and the consequent forward tilting of tier 60 results in the coops of tier 60 being layed on their side on inclined conveyor 30. Control device LS9, an electrical limit switch, detects rotation of rotor 32 into an orientation (72°) at which the coops in tier 60 are laid onto inclined conveyor 30. Rotation of rotor 32 is momentarily stopped at that point as previously mentioned.

Coops laid down onto conveyor 30 trip an electrical limit switch control device LS11 mounted on conveyor 30 and initiate operation of conveyor 30 through the electrical control circuit. Conveyor 30 is also a conventional chain conveyor having a chain engaged by a sprocket on a hydraulic motor to drive the conveyor up the incline. The chain has a dog 90 thereon to engage the bottom side of the lower most coop in an unstacked tier of coops. Conveyor 30 moves the coops toward conveyor end 92. Also, chain dog 90, after delivering the last coop end 92, travels on the underside of conveyor 30 and trips an electrical limit switch control device LS24 mounted on the underside of conveyor 30, which stops movement of conveyor 30.

Also mounted on conveyor 30 are electrical limit switch control devices LS10 and LS11A. Device LS11A when tripped by the coops on conveyor 30 initiate further rotation of rotor 32. Device LS10 initializes the electrical control circuit for further rotation of rotor 32 into the "ready" position for receiving the next tier of coops for lay-down as indicated by actuation of limit switch control device LS8.

As each coop reaches the end 92 of inclined conveyor 30, it drops into coop dump assembly 34. Each coop is caught and comes to rest in a coop support structure 94 adapted to support the coop in an orientation that results in the coop door freely swinging open. Structure 94 may, for example, comprise two parallel rails spaced apart an appropriate distance to support the coop at each end, with the area between the rails being open and without obstruction to the opening of the coop door. Live birds falling out of a coop supported in structure 94 fall onto a slide 96 which delivers the birds to a live bird conveyor 98 that leads to the hang room.

To eject an emptied coop from support structure 94, an air cylinder 100 is mounted beneath end 92 of conveyor 30. Air cylinder 100 is positioned such that the extendable and retractable ram 102 of the cylinder will upon extension engage the back end of a coop supported in structure 94. Air cylinder 100 is activated by a pilot valve control device (not shown) engaged by a coop coming to rest in support structure 94. When activated, air cylinder 100 extends and pushes the coop in support structure 94 out and onto an inclined slide 104. After removal from the support structure coops are in an upside down orientation.

Continuing with reference now to FIG. 3, slide 104 leads to belt conveyor 36. Thus, coops sliding down inclined slide 104 are delivered to belt 36 and are picked-up thereby. Belt conveyor 36 feeds coops to the coop inverter 38. As shown in FIG. 3, coop inverter 38 comprises inverter head 106 and slide 108. Once into inverter head 106, each coop is guided downwardly therethrough and falls by gravity onto slide 108. Movement of a coop through inverter head 106 results in the coop being turned over into a topside-up orientation.

Inverted coops are picked-up by belt conveyor 40 and moved therealong to conveyor belt end 110 where each coop is delivered onto slide 42. At this point, a laborer turns each of the empty coops onto its side and drops the coop down the short slide 42 to restack rotor 44. (See FIGS. 1 and 4).

Although the physical dimensions of the various portions of system 10 are not critical, in order to assist in understanding the apparatus shown in FIGS. 2 and 3, typical dimensions will be ascribed thereto. For example, the distance between the end 92 of conveyor 30 and the end 37 of conveyor 36 may be on the order of 48 inches. The length of slide 104 may suitably be on the order of 30-32 inches. The angle of slide 104 with respect to horizontal may be approximately 25° and the angle 35 between the base of support structure 94 and slide 104 may be on the order of 110°. Finally, both inclined conveyor 30 and belt conveyor 36 may be inclined on the order of 15°.

Turning now to FIG. 4, when the desired number of empty coops, typically five, have been positioned by the laborer adjacent the restack rotor, the group of coops is set upright onto conveyor 48. Restack rotor 44 is driven by a hydraulic motor coupled to a shaft which forms the axis of rotation for the rotor. The motor is activated through depression by the laborer of a push button control device in an electrical control circuit for the outfeed section of system 10.

Each group of coops set upright into a tier are moved along in an outfeed direction by conveyor 48. Activation of the hydraulic motor driving conveyor 48 is in response to tripping of limit switch control device LS13 by a support arm of rotor 44. Conveyor 48 continues to run until a chain dog on the conveyor trips limit switch control device LS16.

Tiers of coops set up on conveyor 48 are pushed onto conveyor 50 which is activated when limit switch control device LS17 is tripped. Conveyor 50, as previously discussed, transports upright tiers to be reloaded on a pallet.

In FIG. 1, a straight-through pallet outfeed embodiment is illustrated. In FIGS. 5 and 6, a right angle pallet outfeed embodiment is shown. In this embodiment, parallel side frame members 112 and 114 are disposed transverse to conveyor 50 and extend laterally beyond the side of conveyor 50. Mounted between side frame members 112 and 114 are several rollers 116, 118, 120 and 122. Pallet guide bar 14 extends along and adjacent side frame member 114. An end guide bar 124 is placed across side frame members 112 and 114 to define an end guide bar.

A pallet loaded with tiers of coops from conveyor 50 after being moved to the end of the pallet conveyor is then moved onto transfer conveyor 126 by air cylinders 123 and 125 that tilt the rollers, as indicated by the dotted lines. The mounting frame for the rollers is hinged at the end 127. As shown, transfer conveyor 126 extends at a right angle to outfeed pallet conveyor 13, thereby providing for removal of reloaded pallets from the side of pallet conveyor 13 rather than from the end as is the case with the straight-through outfeed arrangement of FIG. 1.

Figure 7A:
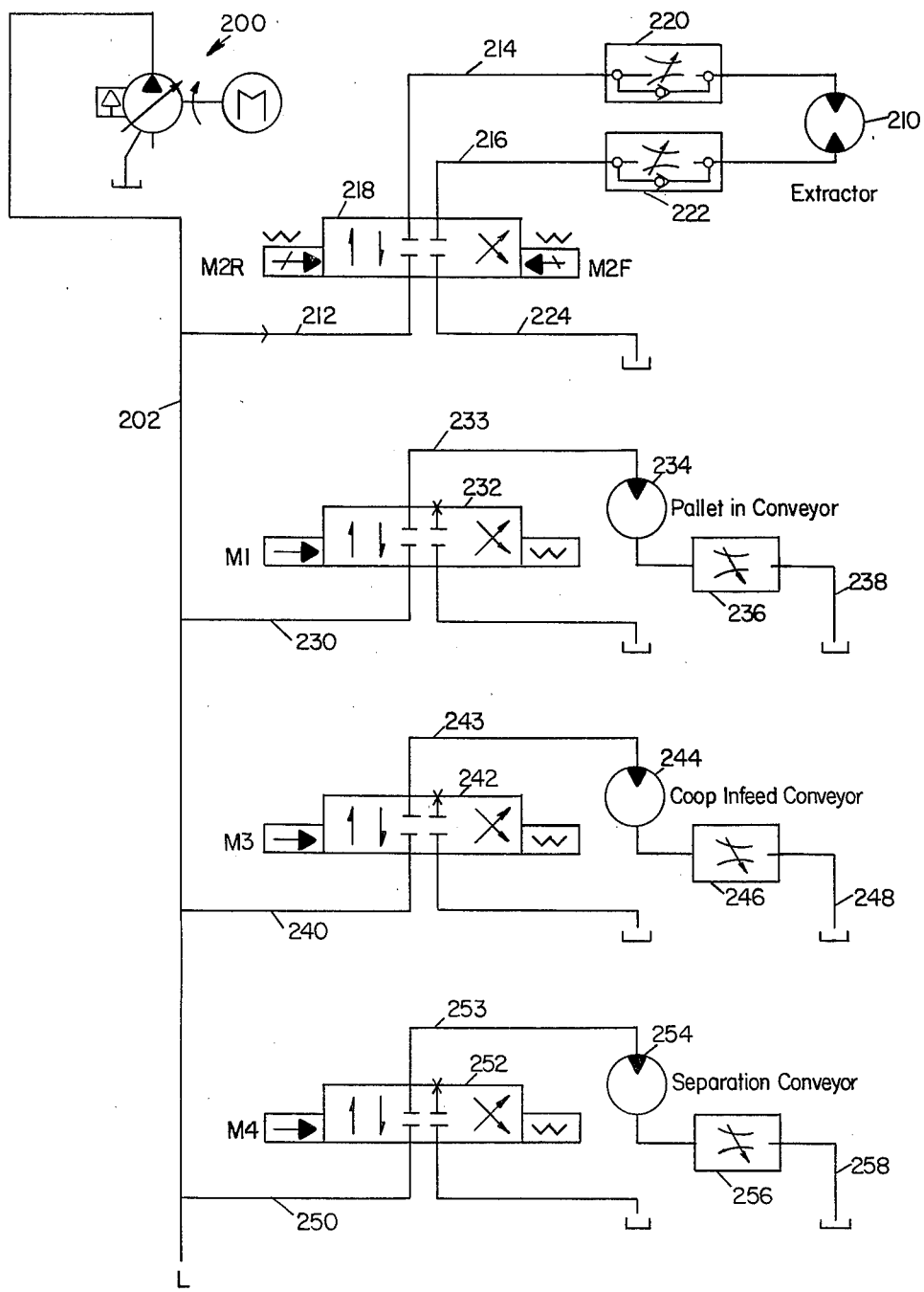
FIGS. 7A-7C together form a schematic diagram of the hydraulic system for the palletized coop handling system.
Figure 7B:
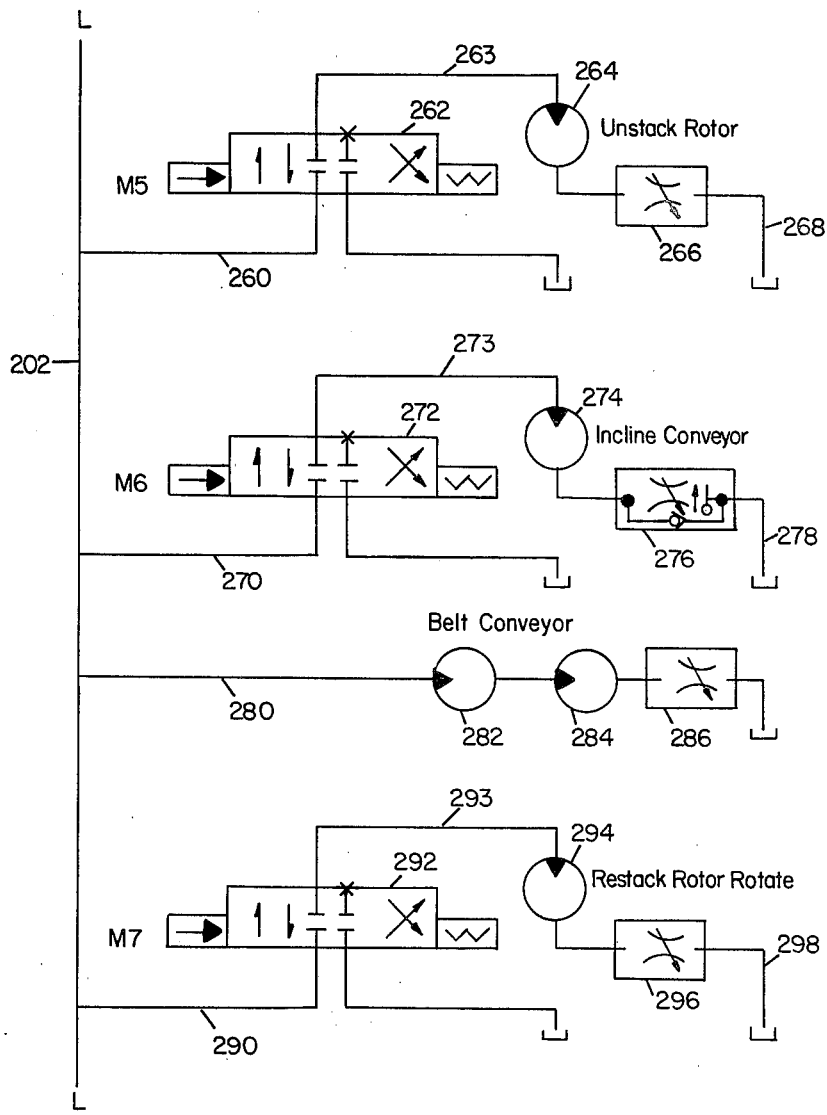
Figure 7C:
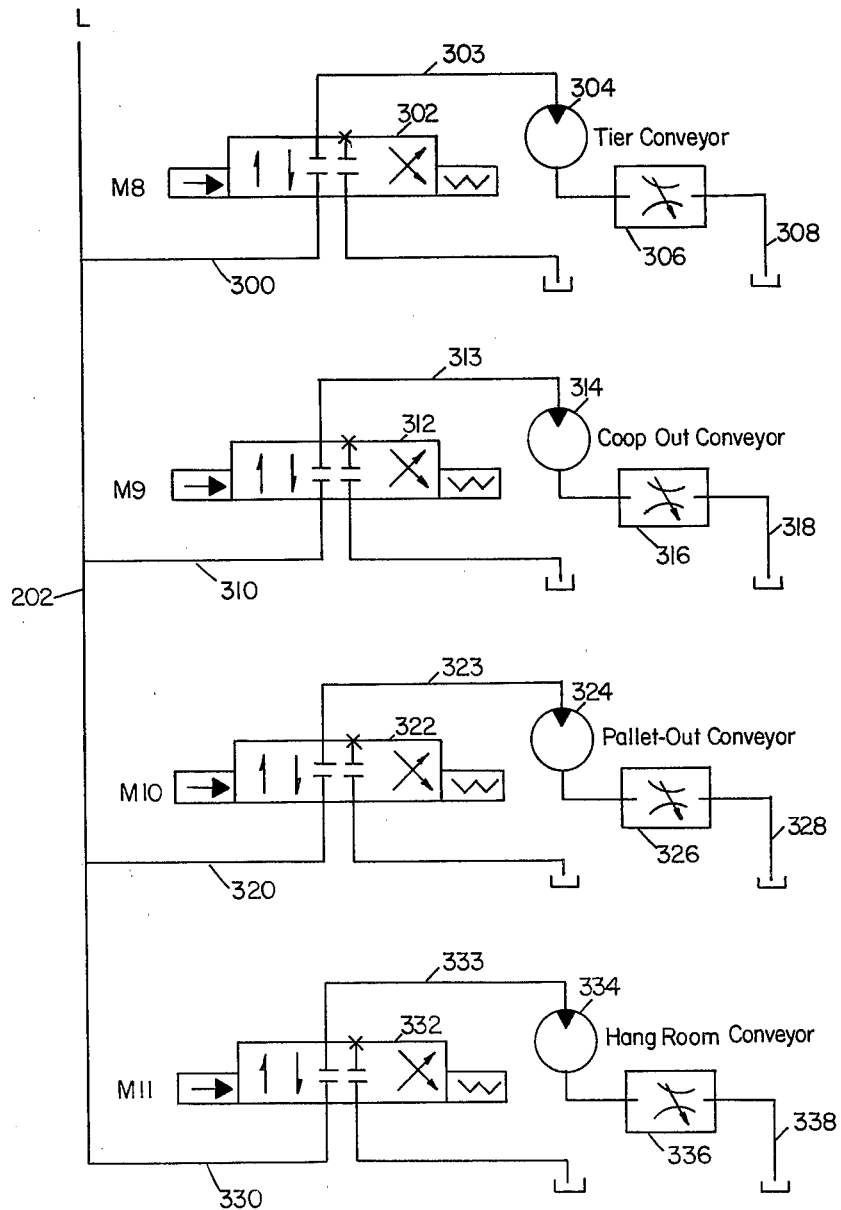

Referring now to FIGS. 7A–C, the hydraulic system of palletized coop handling system 10 is supplied from a variable displacement piston pressure compensator 200 through trunk supply line 202. Individual branch hydraulic lines for the hydraulic subsystems for the various sections of system 10 tap onto trunk line 202 as shown.

Extractor motor 210 is a bidirectional motor to be supplied with hydraulic fluid from a single branch line 212 off trunk line 202. Therefore, first and second hydraulic flow lines 214 and 216, respectively, are established. Flow lines 214 and 216 originate from a two-way spring return hydraulic valve 218 which is biased by a return spring to assume the intermediate position shown. Actuation of the valve to the left creates a cross flow through valve 218 with fluid entering valve 218 from line 212 exiting therefrom into flow line 216. Valve 218 is actuated into this position by magnetic coil M2F in the electrical circuits. When hydraulic valve 218 is actuated to the right to assume the opposite setting, hydraulic fluid from line 212 exits valve 218 through flow line 214. Valve 218 is actuated to this position by magnetic coil M2R in the electrical circuits. It should be understood that hydraulic control valve 218 is adapted to itself be controlled by an electrical control circuit interfaced therewith by a magnetic coil actuation. To complete the structure necessary for bidirectional flow through extractor motor 210, bidirectional control device 220 is connected in flow line 214 and bidirectional flow control device 222 is connected in flow line 216.

Thus, in operation of system 10, when the electrical control circuit initiates an extractor forward sequence, coil M2F therein is energized and valve 218 is actuated to produce hydraulic fluid flow from line 212 into flow line 216. Hydraulic fluid flow is passed through device 222 to motor 210. Circulation of hydraulic fluid through motor 210 continues through device 220 with the fluid being returned to valve 218 through flow line 214. Hydraulic fluid returning to valve 218 is directed into tank return line 224.

When the electrical control circuit calls for the extractor to move in reverse, coil M2R actuates valve 218 to the opposite position placing line 212 in direct fluid communication with flow line 214 and placing tank return line 224 in fluid communication with flow line 216. This arrangement, of course, establishes fluid flow through device 220, 222, and motor 210 in the opposite direction.

The hydraulic control components for the hydraulic subsystem for each of the other sections of system 10 (i.e., pallet-in conveyor, coop infeed conveyor, separation conveyor, etc.) are identical.

For the pallet-in conveyor, branch line 230 supplies hydraulic fluid from trunk line 202 to one-way hydraulic control valve 232. A single outlet flow line 233 extends from valve 232 to pallet-in conveyor motor 234. A one-way flow control device 236 is in series with motor 234. Fluid flow returns through tank return line 238. In operation, valve 232 is actuated by coil M1 in the electrical circuits. When actuated, valve 232 places line 230 in fluid communication with flow line 233 and upon release of coil M1, the spring return on valve 232 returns the valve to the position shown.

The hydraulic subsystem for the coop infeed conveyor is supplied from line 240. Upon actuation by coil M3, valve 242 establishes hydraulic fluid flow through flow line 243 to motor 244. Flow through line 243 and motor 244 is regulated by flow control device 246 between motor 244 and tank return line 248.

The hydraulic subsystem for the separation conveyor is supplied from line 250. Upon energization of coil M4, valve 252 is actuated to establish hydraulic fluid flow through flow line 253 to motor 254. Flow regulation is provided by flow control device 256 in series with motor 254 and tank return line 258.

Continuing with reference to FIG. 7B, the hydraulic subsystem for the unstack rotor is supplied from line 260 and includes hydraulic valve 262, hydraulic motor 264 and flow control device 266. The same series arrangement of the components with flow line 263 linking valve 262 and motor 264 is established. Fluid return is through tank return line 268. Hydraulic valve 262 is actuated upon energization of coil M5.

The hydraulic sybsystem for the incline conveyor is supplied from line 270. Energization of coil M6 actuates valve 272 to establish fluid communication between line 270 and flow line 273, thereby providing hydraulic fluid flow through hydraulic motor 274. Flow control of fluid through motor 274 is controlled by a temperature, pressure compensated flow control device 276 in series with motor 274 and tank return line 278.

The hydraulic subsystem for the belt conveyors is also presented in FIG. 7B. Since no timed operation of the conveyor belts is required, the hydraulic motors 282 and 284 for the conveyors are continuously supplied with hydraulic fluid directly from line 202 through line 280. Flow control through motors 282 and 284 is provided by flow control device 286.

The hydraulic subsystem for the restack rotor is supplied with hydraulic fluid through line 290. Upon energization of coil M7, valve 292 is actuated to place line 290 in fluid communication with flow line 293 which supplies hydraulic fluid to motor 294. Flow control is provided by flow control device 296. Hydraulic fluid circulation is completed through tank return line 298.

Referring now to FIG. 7C, the hydraulic subsystem for the tier conveyor is shown to be supplied from line 300. Upon energization of coil M8, hydraulic valve 302 is actuated to permit fluid flow therethrough to flow line 303. Flow so established continues through motor 304, flow control device 306, and tank return line 308.

The hydraulic subsystem for the coop outfeed conveyor, which comprises motor 314, is supplied from line 310. Actuation of hydraulic valve 312 to place line 310 and flow line 313 in communication occurs upon energization of coil M9. Hydraulic fluid flow entering flow line 313 continues through motor 314, flow control device 316 and tank return line 318.

The hydraulic subsystem for the pallet-out conveyor is supplied with fluid from line 320 and comprises hydraulic valve 322, flow line 323, motor 324, flow control device 326 and tank return line 328. Hydraulic fluid flow is established through motor 324 upon actuation of valve 322 by coil M10.

Finally, the hang room conveyor hydraulic subsystem is supplied from line 330. Energization of coil M11 actuates hydraulic valve 332 establishing fluid flow through flow line 333, motor 334, flow control device 336 and tank return line 338.

Figure 8:
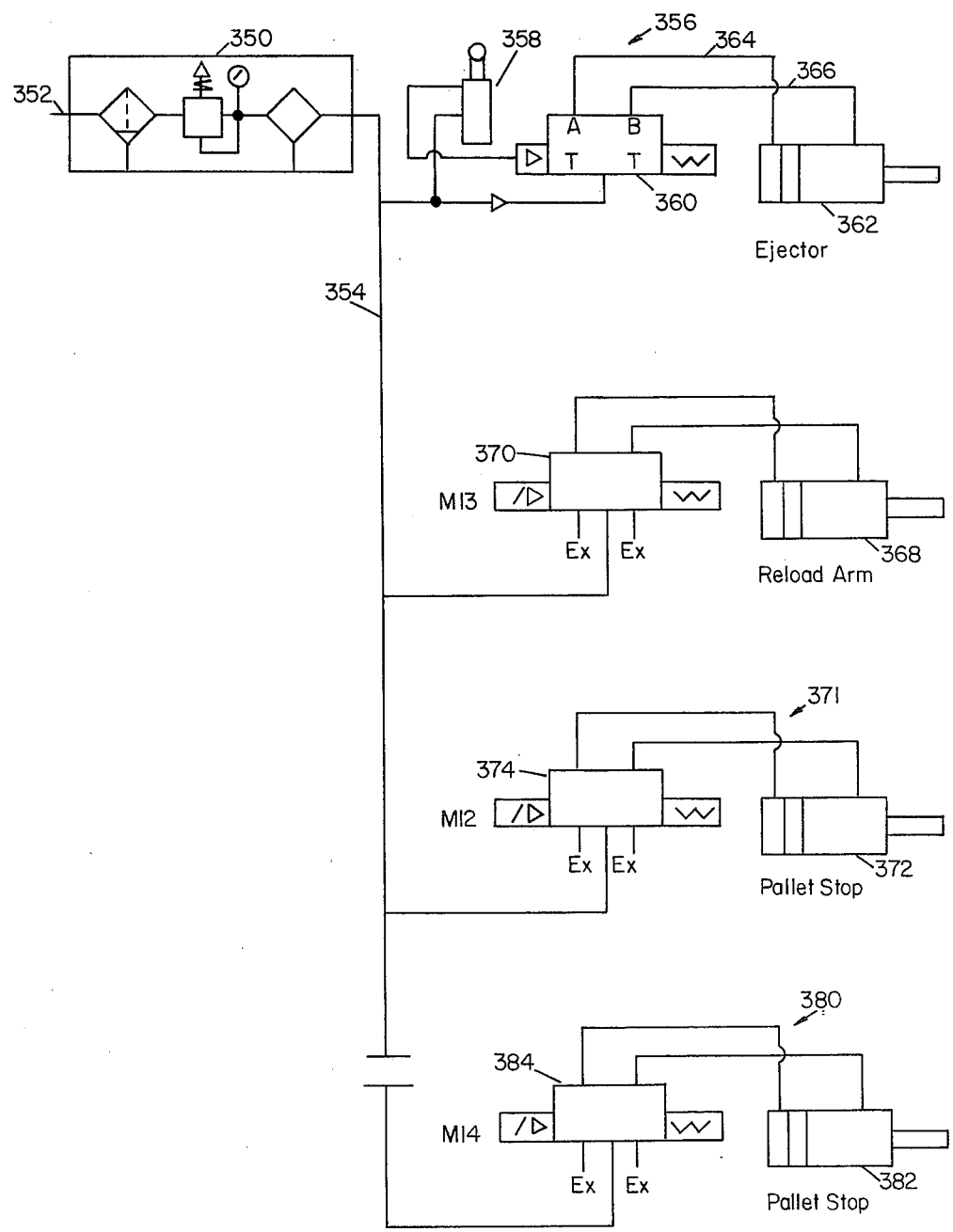
FIG. 8 is a schematic diagram of the air system used in manipulating the coops at various points within the coop handling system.

The pneumatic system utilized in palletized coop handling system 10 is shown in FIG. 8. A filter-regulator-lubricator is included in the pneumatic system and connects by line 352 to a source of high pressure compressed air. Compressed air is provided to a trunk line 354 from which each of the pneumatic subsystems is supplied via a branch line.

The pneumatic subsystem 356 for the coop dump assembly ejector includes a pilot valve 358 which actuates air-piloted control valve 360, in turn actuating hydraulic cylinder 362. When a coop falls into support structure 94 from the incline conveyor, it engages pilot valve 358. Engagement of pilot valve 358 results in the actuation of control valve 360 and establishes through air lines 364 and 366 a pressure differential sufficient to extend ejector cylinder 362. Upon release of pilot valve 358, a spring actuated return on valve 360 causes the valve to return to the opposite position, thus reversing the pressure differential between lines 364 and 366 and causing retraction of hydraulic cylinder 362.

The pneumatic subsystem for the pallet reload arm comprises a cylinder 368 and an air control valve 370.

The pneumatic subsystem for the pallet stop comprises a hydraulic cylinder 372 controlled by an air control valve 374 which is actuated by a manually controlled solenoid.

Pneumatic subsystem 380 is identical to subsystem 371 and is included in only the straight-through outfeed embodiment of the present invention. Pneumatic subsystem 380 comprises air cylinder 382 interconnected with air control valve 384 which is actuated by a manually controlled solenoid.

| Table of Electrical Components | |
|---|---|
| Item Reference | Manufacturing/Part No. |
| Limit Switches LS | Square D E-50-AR1 |
| | E-50-BR-1 |
| Latching Relays LR | Potter-Brownfield KB-17-AG |
| Control Relays CR | Potter-Brownfield KRP-3-LAG |
| Hydraulic Valve Control Coils M | Vickers - 316011 - 120 Volt |

| Table of Hydraulic Components | |
|---|---|
| Variable Displacement Piston Pressure Compensator | Vickers PVB29-LS-20-C11 |
| Two-way Spring Return Hydraulic Valves | Vickers DG4S4-012C-50 |
| One-way Spring Return Hydraulic Valve | Vickers DG4S4-012A-50 |
| Flow Control Valves | Deltrol EDF-25-S |
| Temperature, Pressure Compensated Flow Control Valve | Parker-Hannifin TPCC-1200-S or Vickers FG-02-1500-50 |
| Hydraulic Motors | ROSS TRW MAC-MAB Series |

| Table of Pneumatic Components | |
|---|---|
| Filter-Regulator-Lubricator | Speed Air 7Z554 |
| Pilot Valve | Clippard LVA-3 |
| Air Piloted Control Valve | Mosier LFCOC-05 |
| Air Control Valves Speed Control | Speed-Aire 6X368 |
| Air Cylinders | Mossier - EJ1255B1-05 |
| | Mossier - EJ1255B1-01 |
| Electric Controlled Cylinder Mounted | Mossier - LFCOC-01 |
| Electric Controlled Air Valves | Speed Aire 6X362 |

Figure 9A:
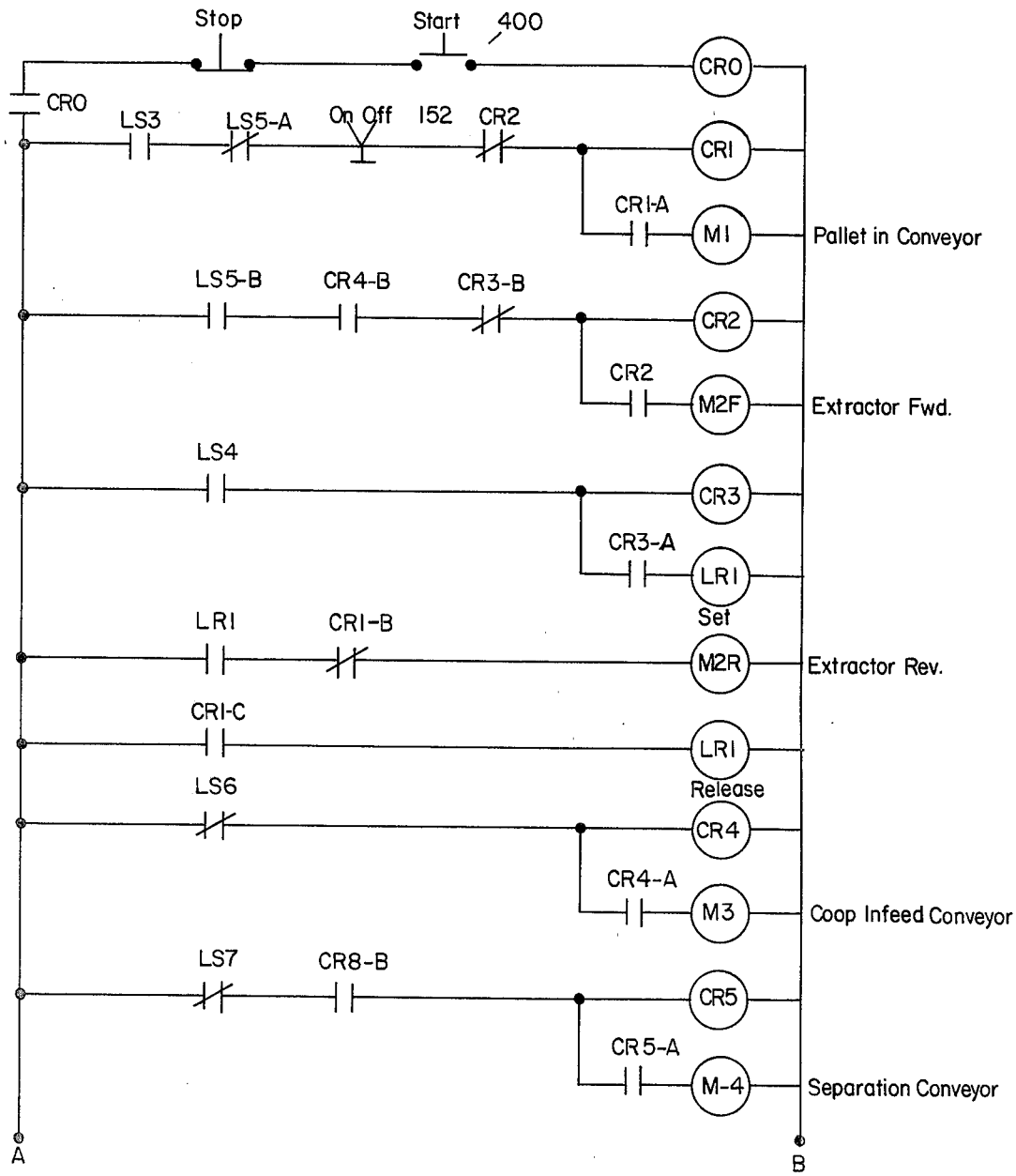
FIGS. 9A and 9B together form a schematic diagram of the electrical control circuitry for controlling operation of the hydraulic system for the infeed section of the right angle outfeed embodiment of the palletized coop handling system.
Figure 9B:
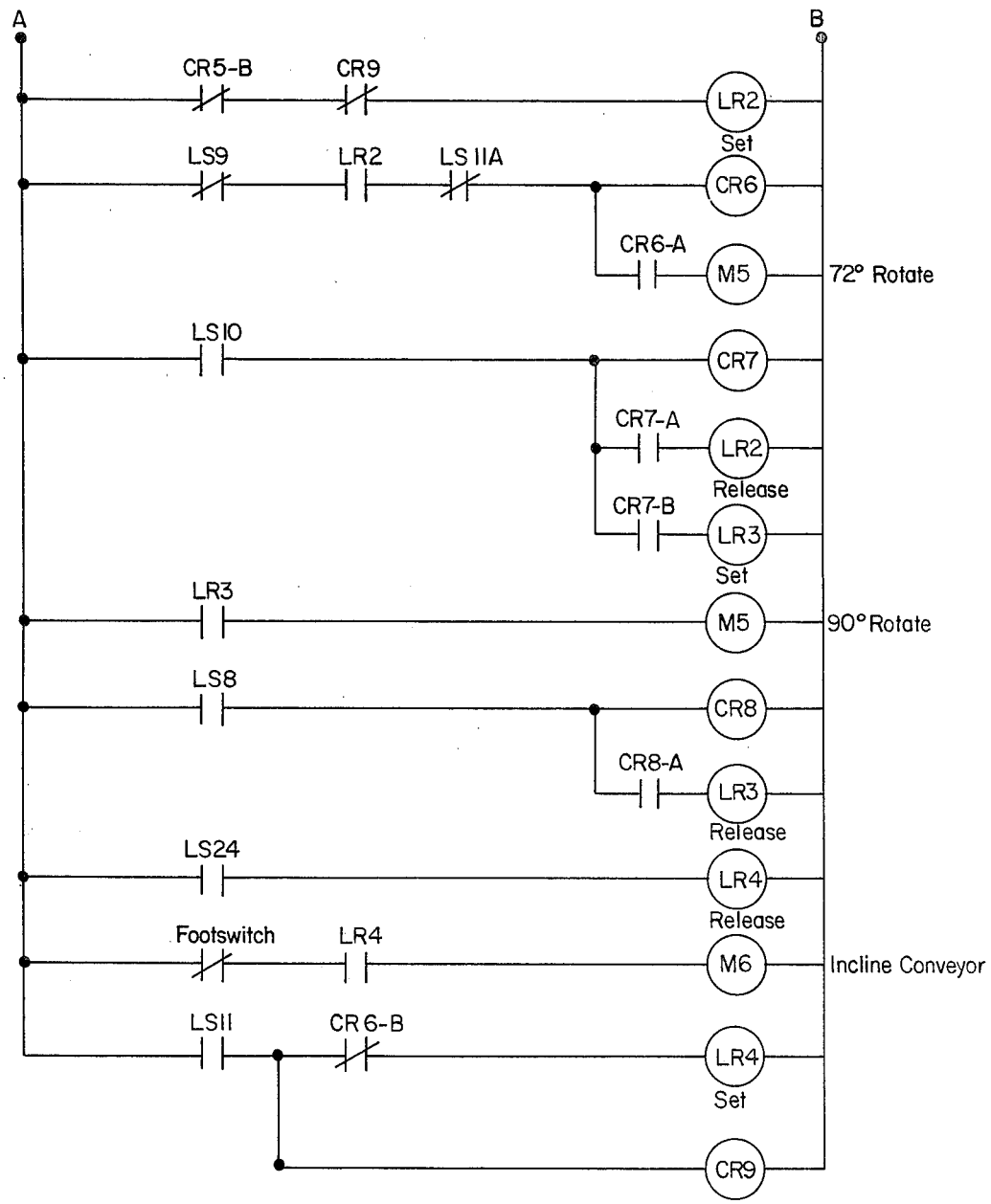

Referring now to FIGS. 9A and 9B, a schematic diagram is provided for an electrical control circuit for sequencing the operation of that portion of the hydraulic system (see FIGS. 7A–C) which operates the infeed section of the right angle embodiment of the palletized coop handling system 10. The infeed section of system 10 encompasses the pallet-in conveyor 12, extractor 20, coop infeed conveyor 16, separation conveyor 26, rotary lay-down unit 28, inclined conveyor 30, coop dump assembly 34, belt conveyor 36 and coop inverter 38.

Figure 10:
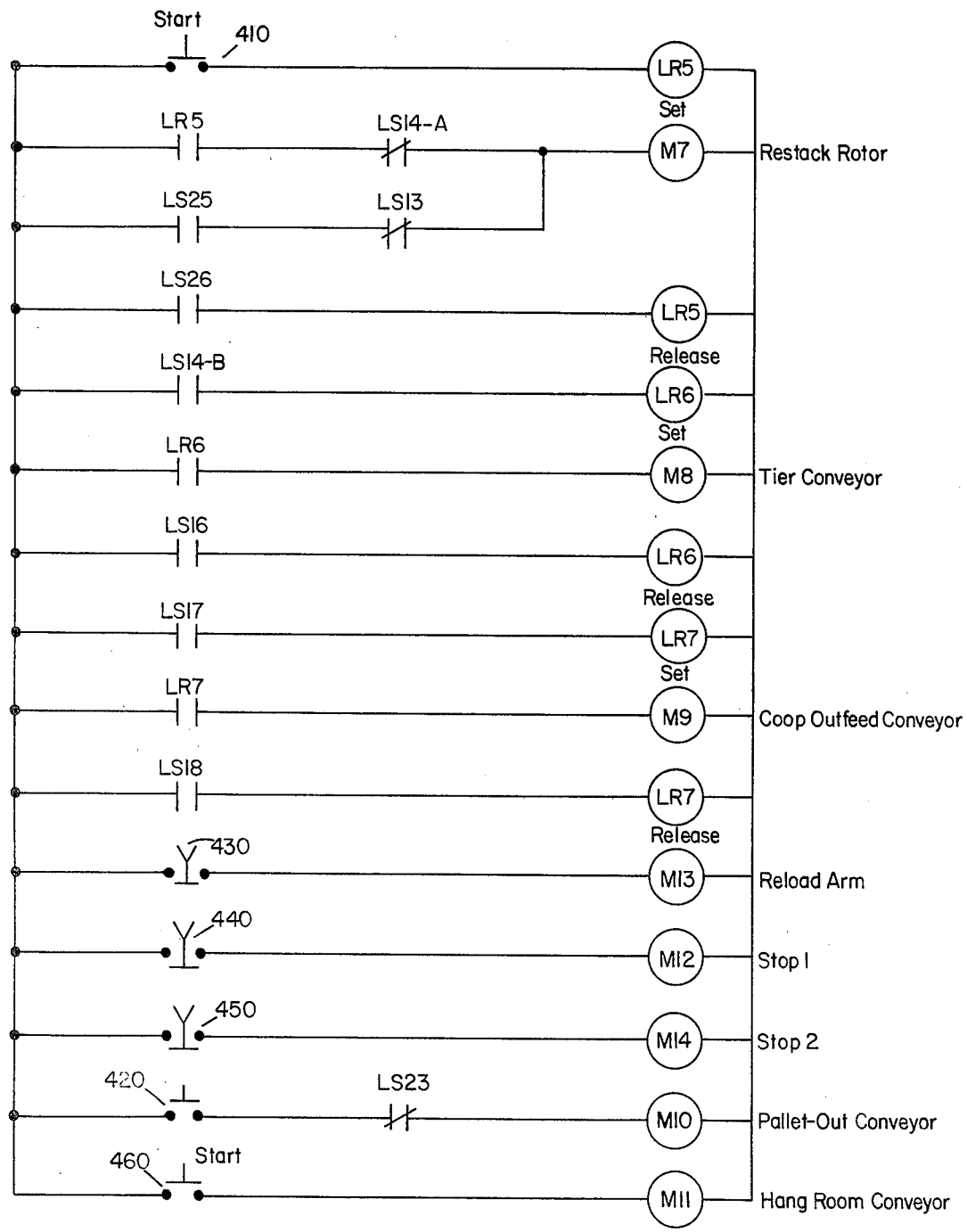
FIG. 10 is a schematic diagram of the electrical control circuitry for controlling operation of the hydraulic system for the outfeed section of the right angle outfeed embodiment of the palletized coop handling system.

FIG. 10 presents a schematic diagram of an electrical control circuit for sequencing the operation of that portion of the hydraulic system (see FIGS. 7A–C) which operates the outfeed section of the right angle embodiment of the palletized coop handling system 10. The outfeed section of system 10 includes belt conveyor 40, restack unit 44, tier conveyor 48, coop outfeed conveyor 50 and right angle pallet outfeed conveyor 13.

The schematic diagram symbols utilized in FIGS. 9 and 10 represent conventional symbols utilized for electrical control circuits which interface with hydraulic or air systems. However, to assure uniform understanding of the diagram symbols, it is pointed out that as used herein the abbreviation "CR" refers to a control relay, the abbreviation "LR" refers to a latch relay, the abbreviation "LS" refers to a limit switch, and the abbreviation "M" refers to a magnetic coil for magnetically actuating an air or hydraulic valve. A circle with the control relay abbreviation "CR" indicates a control relay coil, whereas two parallel lines having an adjacent designation "CR" denotes the contacts of the control relay. The same designation in connection with control relay coil and relay contacts (i.e., the use of the same identifying numeral) indicates that the control relay contacts are actuated by the control relay coil having the same identifying numeral. The same is true for the latch relay designations.

Referring now to FIGS. 9A and 9B, after placement of a pallet on the pallet-in conveyor, palletized coop handling system operation begins with depression of START button 400, which energizes coil CR0, in turn closing contacts CR0. Closure of contacts CR0 applies electrical power to the remainder of the circuit of FIGS. 9A and 9B. Limit switch LS6 being normally closed immediately energizes coil CR4 closing contacts CR4-A and opening contacts CR4-B. Closure of CR4-A energizes coil M3, which in turn actuates a hydraulic control valve controlling the motor driving coop conveyor 16 to start the conveyor.

If extractor 20 is retracted to the position shown in FIG. 1, limit switch LS3 is closed. Provided ON-OFF switch 152 is in the "on" position, coil CR1 is energized, contacts CR1-A are closed, and coil M1 is energized, which activates pallet-in conveyor 12 via a hydraulic control valve actuated by coil M1. The pallet on conveyor 12 is conveyed along thereby until the lead tier of coops thereon engages limit switch LS5. At that point, the pallet is aligned with the end of conveyor 16. As a consequence of engaging LS5, contacts LS5-A open, stopping pallet-in conveyor 12, and contacts LS5-B close, which energizes coil CR2. The result of energizing coil CR2 is that contacts CR2 close, thereby energizing coil M2F. Extractor 20 is then activated to move forward, off-loading one or more tiers of coops onto running coop infeed conveyor 16. As extractor 20 moves forward, LS3 opens, which de-energizes CR1 and causes CR1-B to assume the normally closed condition.

Extractor 20 continues to move forward until limit switch LS4 is engaged. Closure of LS4 energizes coil CR3; whereupon contacts CR3-A close, setting latch relay LR1. Simultaneously, contacts CR3-B open, which deactivates forward movement of extractor 20. The setting of latch relay LR1, however, activates the extractor to move in the reverse direction. When LS3 is again made, indicating extractor 20 is back in the position shown in FIG. 1, coil CR1 is again energized opening contacts CR1-B and closing contacts CR1-C to release LR1.

Because conveyor 16 is running when the tiers of coops are off-loaded from the pallet, the tiers of coops are immediately conveyed thereby to separation conveyor 26, Coop infeed conveyor 16 continues to run until the lead tier of coops thereon is deposited at the input of the separation conveyor, as indicated by engagement of limit switch LS6, which opens. When the coop infeed conveyor is stopped, contacts CR4-B return to the normally open position, prohibiting movement of extractor 20 forward and preventing further off-loading of tiers of coops. However, as long as the coop infeed conveyor is running, the pallet infeed and off-loading sequence continues to take place.

With the unstack rotor in the receiving position (i.e., orientation shown in FIG. 2) limit switch LS8 is closed. Coil CR8 is energized, and contacts CR8-B are closed. Coil CR5 is thereby energized to close contacts CR5-A, which in turn energizes coil M4. Separation conveyor is activated and running. The lead tier of coops at the position of LS6 is moved toward the unstack rotor.

When the lead tier of coops is in position for tilting, limit switch LS7 is engaged thereby and opened, halting separation conveyor. Simultaneously, contacts CR5-B are released to assume the normally closed position, which sets latch relay LR2. Closure of the contacts of latch relay LR2 energizes coil CR6 producing rotation of the unstack rotor. Rotation continues until the rotor is inclined to the angle of inclined conveyor 30. At that point, limit switch LS9 is opened and rotation stops. At this orientation of the unstack rotor, limit switches LS10, 11, and 11A are all engaged.

Closure of LS11 sets latch relay LR4. This energizes coil M6, in turn activating inclined conveyor 30. Closure of LS11 also energizes coil CR9, causing contacts CR9 to open. After relay coil LR2 is de-energized, the contacts of LR2 open.

Inclined conveyor 30 continues to run until all the coops laid thereon are delivered to coop dump assembly 34. The chain dog on inclined conveyor 30 then engages limit switch LS24 to release latch relay LR4 and stop the inclined conveyor.

Closure of LS10 energizes coil CR7. This releases the contacts of latch relay LR2 and sets latch relay LR3 producing further rotation of the unstack rotor. When the rotor is again in the receiving position shown in FIG. 2, limit switch LS8 in again made and latch relay LR3 is released. The unstacking cycle then starts over.

Referring next to FIG. 10, in the outfeed of empty coops, after several empty coops have been set on their side on the restack rotor, START button 410 is depressed, energizing coil LR5 which closes the contacts of latch relay LR5. Coil M7 is then energized, starting rotation of the restack rotor to set the coops upright in a tier. When a group of coops is set upright on tier conveyor 48, limit switch LS26 is engaged. Closure of LS26 causes a release of latch relay LR5 and readys it for the next rotation cycle.

After the rotor has completed the quarter revolution that sets the empty coops upright into a tier, limit switch LS14 is tripped. This causes contacts LS14-A to open, halting rotation of the restack rotor. Simultaneously, contacts LS14-B close resulting in latch relay LR6 being set. At that moment tier conveyor 48 is activated and begins moving the restacked tier of coops. Their conveyor 48 continues running until a chain dog thereon trips limit switch LS16 which causes latch relay LR6 to be released.

When several restacked tiers are pushed out onto conveyor 50, limit switch LS17 is engaged. Closure of LS17 sets latch relay LR7 and through coil M9 activates coop outfeed conveyor 50. Conveyor 50 continues to run until a chain dog thereon trips limit switch LS18, which releases latch relay LR7 and stops the conveyor.

To move a pallet across to the end of conveyor 50 for reloading restacked tiers of empty coops, pallet-out conveyor 13 must be activated. This occurs upon manual actuation of push button 420 which energizes coil M10. Pallet-out conveyor 13 continues to run moving a pallet until button 420 is released.

Tiers of empty coops loaded onto a pallet by coop outfeed conveyor 50 are pushed into final position on the pallet by the reload arm which is manipulated by an air cylinder under manual control through selector switch 430. After the operator has assured proper positioning of the tiers of empty coops on the pallet, button 420 is again actuated by the operator. This causes the pallet-out conveyor to again run, moving the pallet further along on conveyor 13 and also moving the pallet laterally of the end of the coop outfeed conveyor. The pallet-out conveyor continues to move the pallet until button 420 is released. After final loading of the pallet, it is shifted onto transfer conveyor 126 by actuation of selector switches 440 and 450 which raise the roller frame. Upon reaching the end of the transfer conveyor, the pallet engages limit switch LS23 which disables the pallet-out conveyor 13 until the pallet is picked-up for delivery to the livehaul truck.

Figure 11:
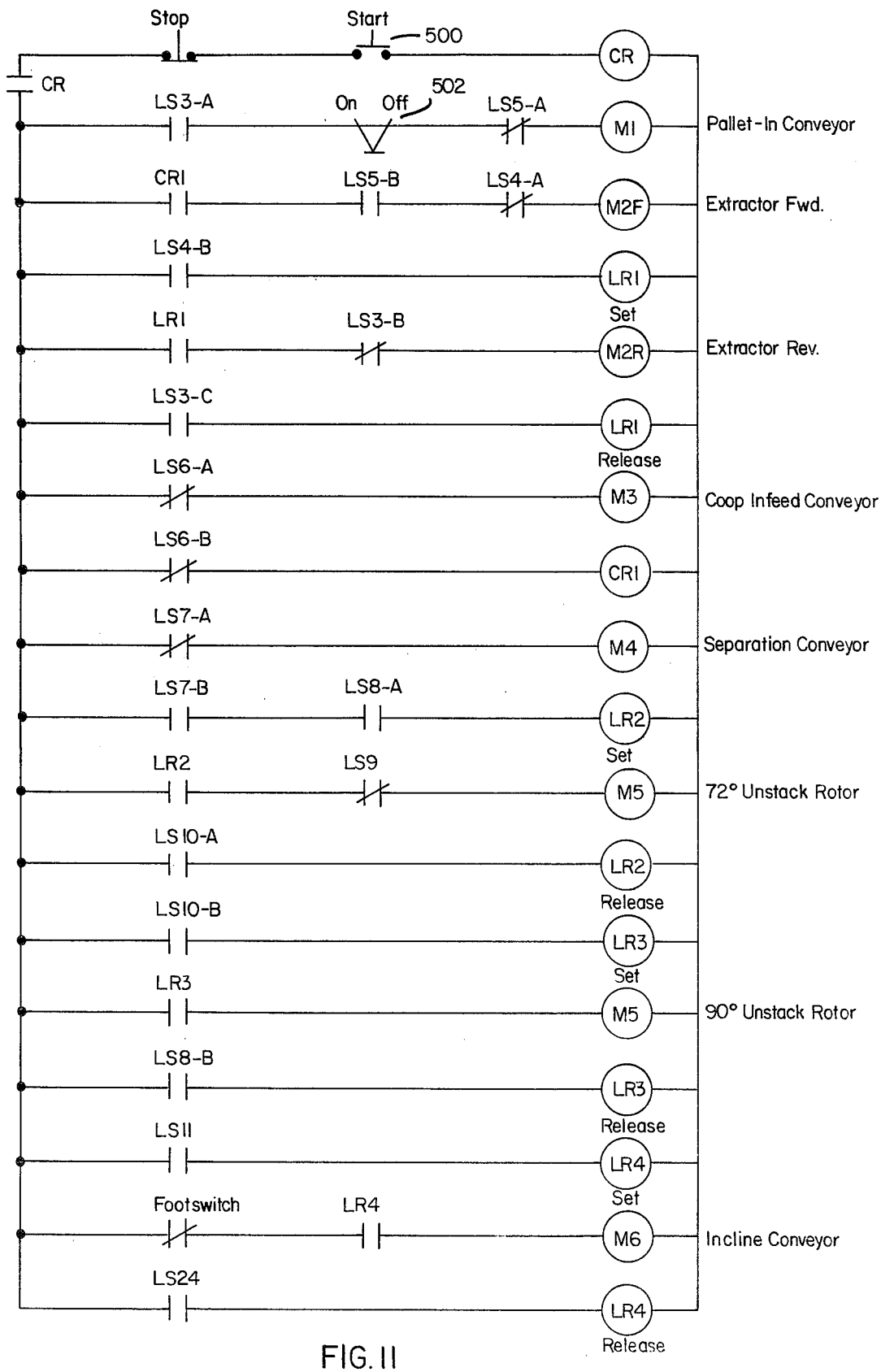
FIG. 11 is a schematic diagram of the electrical control circuitry for controlling operation of the hydraulic system for the infeed section of the straight through outfeed embodiment of the palletized coop handling system.

Referring now to FIG. 11, a schematic diagram is provided for an electrical control circuit for sequencing the operation of the hydraulic system shown in FIGS. 7A-C which operates the infeed section of the straight-through embodiment of the palletized coop handling system 10. The schematic diagram symbols utilized in FIG. 11 represent conventional symbols utilized for electrical control circits which interface with hydraulic or air systems. Also, in FIG. 11 the same reference designations and abbreviations therefor will be utilized as used previously in connection with FIGS. 9 and 10.

After placement of a pallet on the pallet-in conveyor 12, palletized coop handling system operation begins with depression of START button 500, which energizes coil CR, in turn closing contracts CR. Closure of contacts CR applies electrical power to the remainder of the circuit of FIG. 11. Limit switch LS6 being normally closed immediately energizes coil M3 and starts the coop conveyor to run. Also, control relay coil CR1 is energized and closes the contacts of control relay CR1.

If extractor 20 is retracted to the position shown in FIG. 1, limit switch LS3 is closed. Provided in ON-OFF switch 502 is the "on" position, coil M1 is energized. This, of course, activates the pallet-in conveyor. Limit switch LS3 has several sets of contacts, LS3-A through LS3-C. When contacts LS3-C close, latch relay LR1 is released.

The pallet on conveyor 12 is moved along until limit switch LS5 is engaged. At that point, the pallet is aligned with the end of conveyor 16. As a consequence of LS5 being engaged, contacts LS5-A open, stopping pallet-in conveyor 12 by reason of coil M1 becoming de-energized.

Simultaneously, contacts LS5-B close and coil M2F is energized causing extractor 20 to move forward. Extractor 20 as it moves forward off-loads one or more tiers of coops onto running infeed conveyor 16. Also, limit switch LS3 is released, permitting contacts LS3-B to re-assume the normally closed position.

Extractor 20 continues to move forward until limit switch LS4 is engaged. Upon contacts LS4-A opening, coil M2F is de-energized. Closure of LS4-B, however, energizes coil LR1 which sets the contacts of latch relay LR1 closed. As a result, coil M2R is energized causing extractor 20 to move rearward. When limit switch LS3 is again made, indicating extractor 20 is back in the position shown in FIG. 1, coil M1 is again energized; and, of course, coil M2R is deenergized by reason of the opening of LS3-B.

Tiers of coops off-loaded from the pallet are conveyed to separation conveyor 26. When the lead tier reaches the separation conveyor, limit switch LS6 is engaged, opening contacts LS6-A and LS6-B. This halts the coop infeed conveyor and disables control relay CR1. The separation conveyor, however, continues to run leaving the lead tier to the unstack rotor. When the tier arrives, limit switch LS7 is engaged, opening contacts LS7-A and closing contacts LS7-B. The opening of contacts LS7-A de-energizes coil M4 and stops the separation conveyor.

If the unstack rotor is in the receiving position as shown in FIG. 2, limit switch LS8 is closed. Thus, closure of contacts LS7-B energizes coil LR2 which in turn sets latch relay contacts LR2 closed. With limit switch LS9 in its normally closed position, closure of the contacts of latch relay LR2 energizes coil M5 to produce rotation of the unstack rotor.

Rotation of the unstack rotor continues until the rotor is inclined to the angle of incline conveyor 30. At that point rotation is stopped by engagement of the rotor with LS9, which opens, causing coil M5 to be de-energized. At the inclined orientation, the unstack rotor engages limit switches LS10 and LS11. Closure of contacts LS10-A releases latch relay LR2 and closure of contacts LS10B sets latch relay LR3. Closure of the contacts of LR3 re-energizes coil M5 to produce further rotation of the unstack rotor. Rotation stops when limit switch LS8 is again engaged which causes release of latch relay LR3 by reason of the closure of contacts LS8-B.

Closure of LS11 sets latch relay LR4. Closure of the contacts of LR4 energizes coil M6 and starts inclined conveyor. The incline conveyor runs until a chain dog thereon engages limit switch LS24 which causes release of latch relay LR4.

Figure 12:
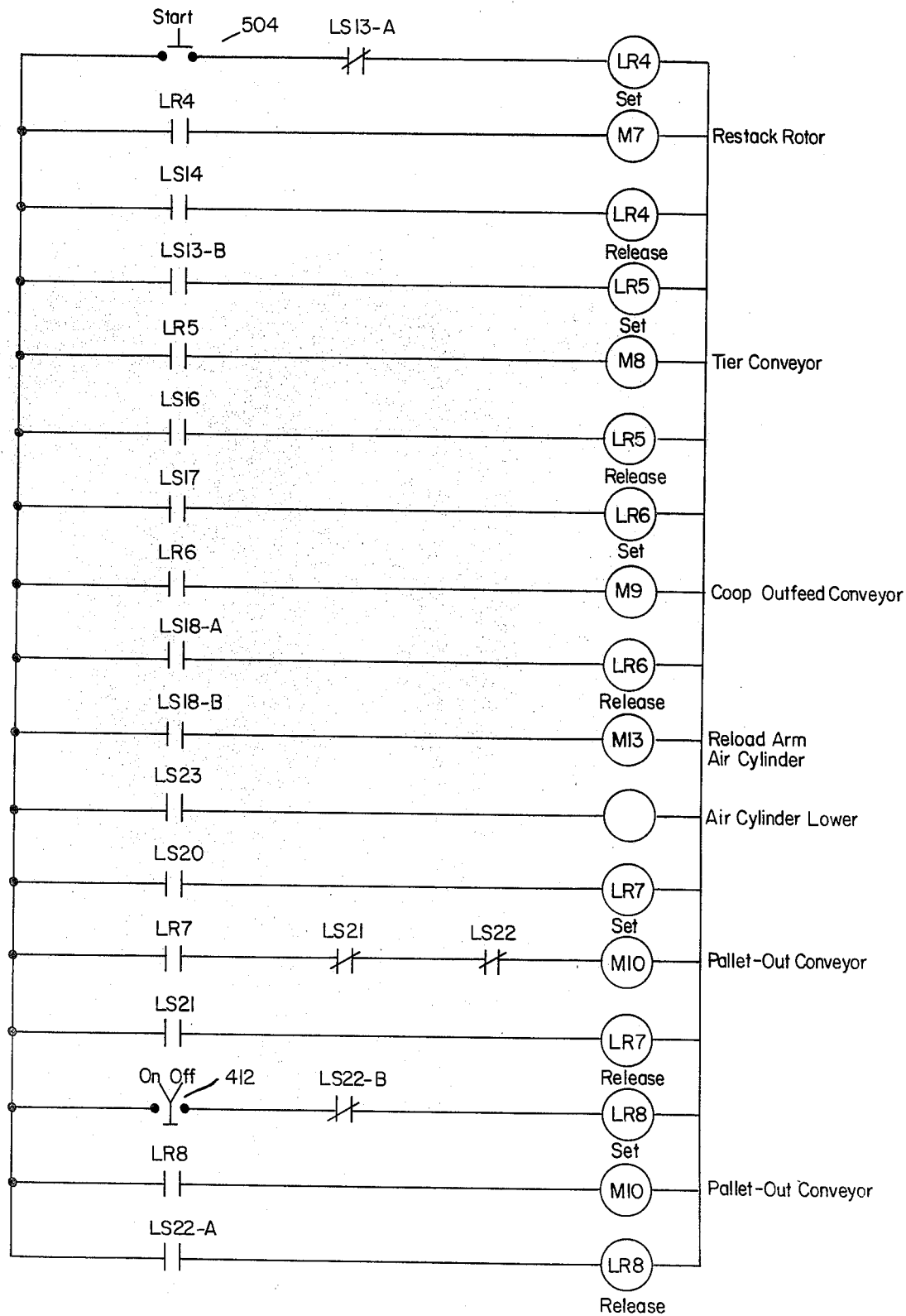
FIG. 12 is a schematic diagram of the electrical control circuitry for controlling operation of the hydraulic system for the outfeed section of the straight through outfeed embodiment of the palletized coop handling system.

Referring finally to FIG. 12, in the outfeed of empty coops, several empty coops are set on their side on the restack rotor. START button 504 is depressed, energizing coil LR4 and setting closed the contacts of LR4. Coil M7 is then energized, starting rotation of the restack rotor to set the coops upright. As the restack rotor rotates, limit switch LS13 is tripped. As a consequence, contacts LS13-A open and contacts LS13-B close. Closure of contacts LS13-B sets latch relay LR5, which in turn energizes coil M8 to start the tier conveyor 48.

After the rotor has completed the quarter revolution required to set the empty coops upright into a tier, limit switch LS14 is closed, releasing latch relay LR4. Release of LR4 opens the contacts thereof and de-energizes coil M7, preventing further rotation of the restack rotor until another rotation is initiated by button 504. Tier conveyor 48 continues running until a chain dog thereon trips limit switch LS16 which causes latch relay LR5 to be released. Upon release, the contacts of LR5 open and coil M8 is de-energized and tier conveyor 48 is de-activated.

When several restacked tiers are pushed out onto conveyor 50, limit switch LS17 is engaged. Closure of LS17 sets latch relay LR6 and through coil M9 coop-out conveyor 50 is activated to run. Conveyor 50 continues to run until a chain dog on the conveyor trips limit switch LS18. Upon that occurrence, contacts LS18-A release latch relay LR6, and contacts LS18-B energize coil M13 which actuates air control valve 370 in FIG. 8 to cause extension of reload arms cylinder 368. Release of latch relay LR6 stops coop-out conveyor 50.

To move a pallet across to the end of conveyor 50 for reloading restacked tiers of empty coops, pallet-out conveyor 13 must be activated. This occurs upon engagement of limit switch LS20 by an empty pallet from pallet-in conveyor 12. Closure of LS20 causes latch relay LR7 to be set, which in turn energizes coil M10 and activates the pallet-out conveyor which continues to run moving a pallet to the end of coop outfeed conveyor 50 until limit switch LS21 is tripped. Closure of LS21 releases latch relay LR7 permitting the contacts thereof to open, thereby de-energizing coil M10 and stopping conveyor 13.

Tiers of empty coops loaded onto a pallet by the coop outfeed conveyor are pushed into final position on the pallet by the reload arm air cylinder which has already been described. After an operator at the end of the pallet-out conveyor has assured proper positioning of the tiers of empty coops on the pallet, ON-OFF switch 412 is actuated by him to set latch relay LR8. This causes the pallet-out conveyor to again run, moving the pallet further along on conveyor 13 and also moving the pallet laterally of the end of the coop outfeed conveyor.

The pallet-out conveyor 13 continues to move the pallet until limit switch LS22 at the end of the conveyor is engaged. Upon this occurrence, latch relay LR8 is released, since contacts LS22-A are closed and contacts LS22-B are opened. Pallet-out conveyor 13 stops, and loading of the pallet is completed.

The pallet thus loaded is picked-up and taken to the livehaul truck.

The foregoing description of the present invention has been directed to particular preferred embodiments for purposes of explanation and illustration. It will be apparent, however, that many modifications and changes in the illustrated structure may be made without departing from the essence of the invention. It is the invention in the following claims to cover equivalent forms of implementing the concepts expressed herein.

What is claimed is:

1. Apparatus for automatically handling poultry coops containing live birds and arranged in tiers on a pallet to unload the birds from the coops, and to load tiers of empty coops onto an empty pallet, which comprises:

means for unstacking a tier of poultry coops;
   means for dumping the birds from each unstacked coop to empty each of said coops;
   a coop infeed conveyor for advancing a tier of poultry coops toward said unstacking means;
   a coop outfeed conveyor adjacent said coop infeed conveyor and laterally spaced-apart therefrom, for advancing a tier of empty poultry coops along a defined path;
   a pallet conveyor extending transverse to said coop infeed conveyor and said coop outfeed conveyor, for receiving thereon a pallet carrying a tier of poultry coops containing live birds and moving the pallet to a position that places the tier of coops thereon in alignment with said coop infeed conveyor, and for advancing the pallet after the tier of coops is removed therefrom to a position in alignment with the end of said coop outfeed conveyor so as to be positioned to receive thereon a tier of empty coops;
   said pallet conveyor comprising an infeed pallet conveyor section and an outfeed pallet conveyor section, said infeed and outfeed pallet conveyor sections being independently operable; and
   a transfer conveyor extending transverse to the outfeed section of said pallet conveyor and disposed adjacent the end thereof, for receiving thereon a pallet transferred from said pallet conveyor;
   said outfeed section of said pallet conveyor comprising:

first and second parallel, spaced-apart side frame members disposed transverse to said coop outfeed conveyor, a tiltable frame mounted for lateral tilting with respect to said side frame member, a plurality of rollers extending transversely to said side frame members and mounted to said tiltable frame, and means for tilting said tiltable frame to laterally transfer a pallet onto said transfer conveyor.

* * * * *